(12) United States Patent
Guarneri

(10) Patent No.: US 11,335,332 B2
(45) Date of Patent: May 17, 2022

(54) TRIGGER TO KEYWORD SPOTTING SYSTEM (KWS)

(71) Applicant: STMicroelectronics S.r.l., Agrate Brianza (IT)

(72) Inventor: Nunziata Ivana Guarneri, Caltanissetta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 341 days.

(21) Appl. No.: 16/708,983

(22) Filed: Dec. 10, 2019

(65) Prior Publication Data

US 2021/0065689 A1 Mar. 4, 2021

(30) Foreign Application Priority Data

Sep. 3, 2019 (IT) .................. 102019000015506

(51) Int. Cl.
*G10L 15/00* (2013.01)
*G10L 15/08* (2006.01)
(Continued)

(52) U.S. Cl.
CPC ............ *G10L 15/083* (2013.01); *G10L 15/04* (2013.01); *G10L 15/16* (2013.01); *G10L 15/22* (2013.01);
(Continued)

(58) Field of Classification Search
None
See application file for complete search history.

(56) References Cited

U.S. PATENT DOCUMENTS 7,835,910 B1 11/2010 Hakkani-Tur et al.
8,930,196 B2 1/2015 Jung et al.
(Continued)

FOREIGN PATENT DOCUMENTS

EP 0977174 B1 5/2003
WO 9916052 A2 4/1999
(Continued)

OTHER PUBLICATIONS

Cohen, I., "Noise Spectrum Estimation in Adverse Environments: Improved Minima Controlled Recursive Averaging", IEEE Transactions on Speech and Audio Processing, vol. 11, No. 5, Sep. 2003, 10 Pages.
(Continued)

*Primary Examiner* — Satwant K Singh
(74) *Attorney, Agent, or Firm* — Slater Matsil, LLP

(57) ABSTRACT

In accordance with embodiments, methods and systems for a trigger to the KWS are provided. The computing device converts an audio signal into a plurality of audio frames. The computing device generates a Mel Frequency Cepstral Coefficients (MFCC) matrix. The MFCC matrix includes N columns. Each column of the N columns comprises coefficients associated with audio features corresponding to a different audio frame of the plurality of audio frames. The computing device determines that a trigger condition is satisfied based on an MFCC_0 buffer. The MFCC_0 buffer comprises a first row of the MFCC matrix. The computing device then provides the MFCC matrix to a neural network for the neural network to use the MFCC matrix to make keyword inference based on the determining that the trigger condition is satisfied.

24 Claims, 9 Drawing Sheets

(51) Int. Cl.
*G10L 15/04* (2013.01)
*G10L 15/16* (2006.01)
*G10L 15/22* (2006.01)
*G10L 25/24* (2013.01)
*H04R 1/08* (2006.01)

(52) U.S. Cl.
CPC ........ *G10L 25/24* (2013.01); *G10L 2015/088* (2013.01); *H04R 1/08* (2013.01)

(56) References Cited

U.S. PATENT DOCUMENTS

| | | | |
|---|---|---|---|
| 9,600,231 | B1 | 3/2017 | Sun et al. |
| 9,672,815 | B2 | 6/2017 | Ganapathiraju et al. |
| 10,079,015 | B1 * | 9/2018 | Lockhart ................. G10L 15/08 |
| 10,121,494 | B1 * | 11/2018 | Sundaram ............... G10L 15/02 |
| 10,181,323 | B2 | 1/2019 | Beckhardt et al. |
| 10,186,265 | B1 | 1/2019 | Lockhart et al. |
| 10,192,546 | B1 * | 1/2019 | Piersol .................... G10L 15/08 |
| 10,304,475 | B1 * | 5/2019 | Wang ........................ G01S 3/80 |
| 10,332,517 | B1 * | 6/2019 | Wang ....................... G10L 15/26 |
| 10,373,612 | B2 | 8/2019 | Parthasarathi et al. |
| 10,431,211 | B2 | 10/2019 | Kim et al. |
| 2017/0040016 | A1 | 2/2017 | Cui et al. |
| 2017/0092262 | A1 | 3/2017 | Pinhasi et al. |
| 2017/0110115 | A1 | 4/2017 | Song et al. |
| 2018/0233130 | A1 | 8/2018 | Kaskari et al. |
| 2018/0261225 | A1 | 9/2018 | Watanabe et al. |
| 2018/0350347 | A1 * | 12/2018 | Fukuda ................. G10L 15/063 |
| 2019/0043491 | A1 | 2/2019 | Kupryjanow et al. |
| 2019/0156818 | A1 * | 5/2019 | Piersol ................... G10L 15/08 |
| 2019/0318757 | A1 | 10/2019 | Chen et al. |

FOREIGN PATENT DOCUMENTS

| | | |
|---|---|---|
| WO | 0122400 A1 | 3/2001 |
| WO | 2017218492 A1 | 12/2017 |
| WO | 2019108849 A1 | 6/2019 |

OTHER PUBLICATIONS

Gerkmann, T., et al., "Unbiased MMSE-Based Noise Power Estimation with Low Complexity and Low Tracking Delay", IEEE Transactions on Audio, Speech and Language Processing vol. 20, Issue 4, May 2012, 10 Pages.

Li, B., et al., "Comparison of Discriminative Input and Output Transformations for Speaker Adaptation in the Hybrid NN/HMM Systems", Interspeech, Sep. 26-30, 2010, 4 Pages, Makuhari, Chiba, Japan.

Zhuang, X., et al., "Real-world acoustic event detection", Pattern Recognition Letters 31, Feb. 19, 2010, 9 pages.

* cited by examiner

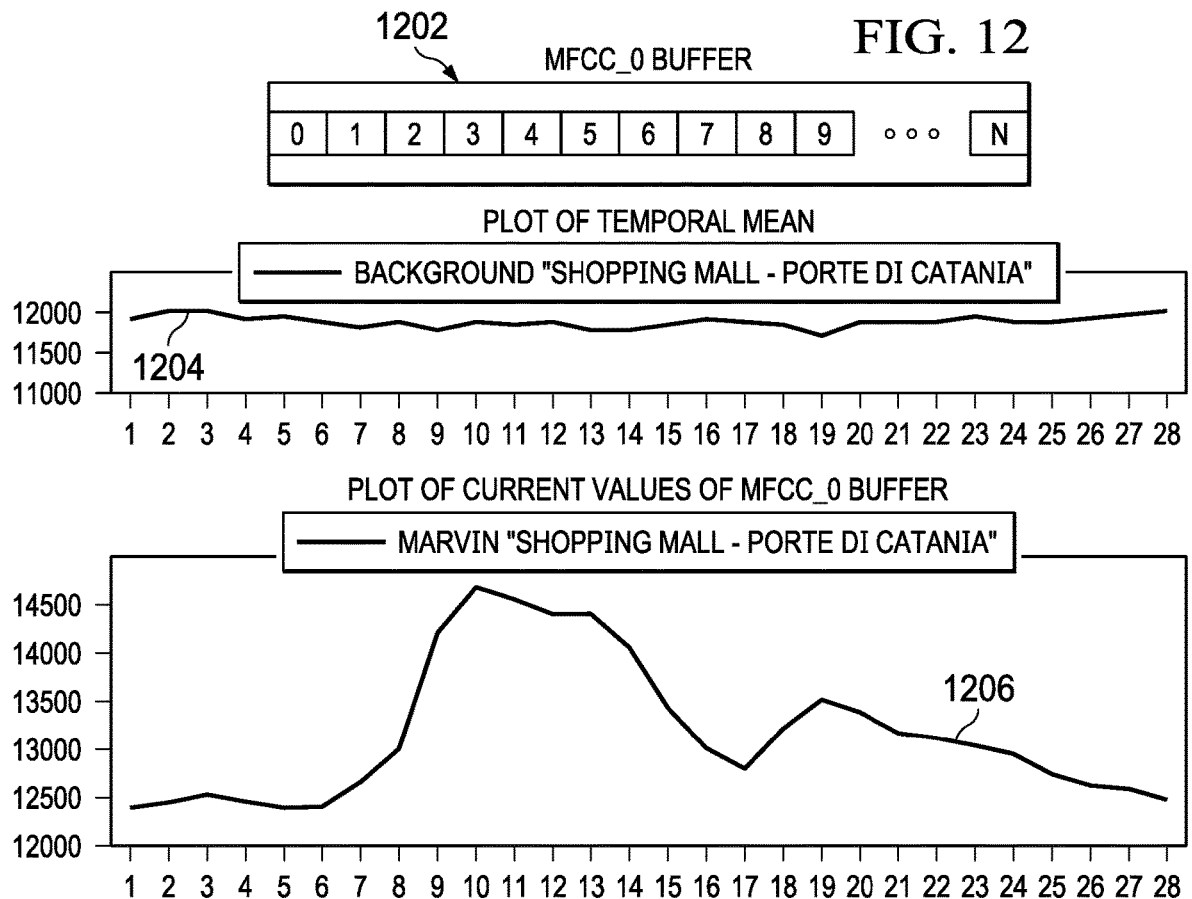
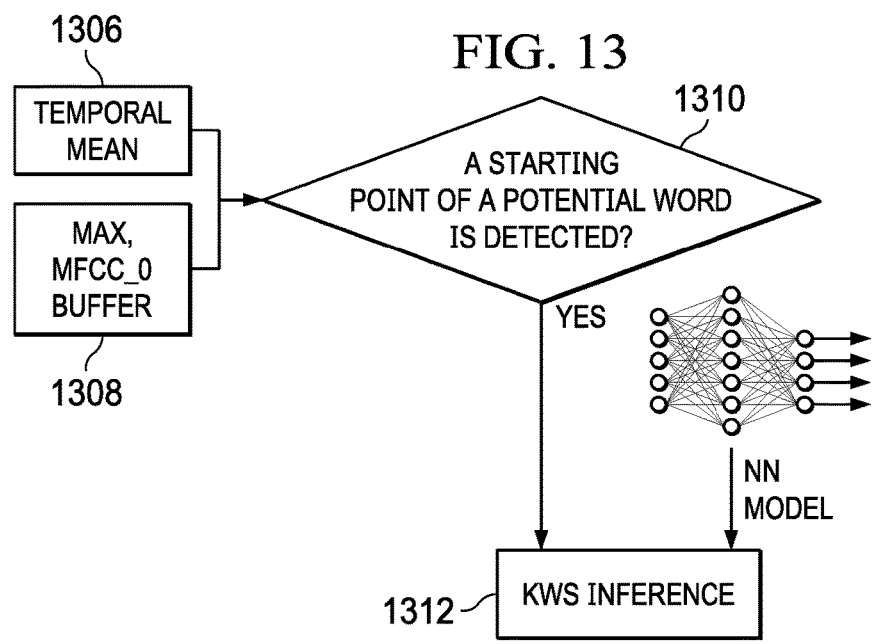

TRIGGER TO KEYWORD SPOTTING SYSTEM (KWS)

This application claims priority to Italian Patent Application No. 102019000015506, filed on Sep. 3, 2019, which is incorporated herein by reference in its entirety.

TECHNICAL FIELD

The present invention relates generally to systems and methods for automatic speech recognition (ASR), and, in particular embodiments, to trigger based keyword spotting system (KWS).

BACKGROUND

Keyword spotting is a technique in the context of speech processing. In speech processing, keyword spotting deals with the identification of keywords in utterances. A keyword spotting system (KWS) is a software application usually running on an edge computing device that allows typically the automatic speech recognition (ASR). An edge computing device is a computing device having one or more microcontrollers (e.g., CPUs) and additional peripheral devices such as one or more microphones and/or one or more cameras. One example of an edge computing device is a mobile smart phone having one or more CPUs, the memory, and one or more microphones/cameras.

The performance and accuracy of KWS running on the edge computing device depend on a number of factors, such as the number of microphones, the number and speed of the CPUs, the size of the memory, and the algorithm used for KWS (e.g., a neural network model or a classical approach without the neural network).

Conventional KWS systems often utilize a KWS pipeline. A classical KWS pipeline may include an advanced front end unit, a voice activity detector unit, a feature extraction unit, an inference unit, and an inference post processing unit. However, there are technical drawbacks in the conventional KWS systems. The conventional approach suffers the accuracy issue of false positives. For example, a conventional KWS system may falsely recognize background noise as keywords spoken by a person. In addition, the classical KWS pipeline having these five-stage units requires a significant amount of CPU and memory resources, which impacts the overall performance and power consumption of the conventional KWS systems. Accordingly, technical solutions to technical problems of the conventional KWS approach are desired to enhance accuracy, improve performance, and lower power consumption for keyword spotting systems.

SUMMARY

In accordance with embodiments, methods for a trigger to the KWS are provided. The computing device converts an audio signal into a plurality of audio frames. The computing device generates a Mel Frequency Cepstral Coefficients (MFCC) matrix based on the plurality of audio frames. The MFCC matrix includes N columns. Each column of the N columns comprises coefficients associated with audio features corresponding to a different audio frame of the plurality of audio frames. The computing device determines that a trigger condition is satisfied based on an MFCC_0 buffer. The MFCC_0 buffer comprises a first row of the MFCC matrix. The computing device then provides the MFCC matrix to a neural network for the neural network to use the MFCC matrix to make keyword inference based on the determining that the trigger condition is satisfied.

In some embodiments, to determine that a trigger condition is satisfied, the computing device receives a new audio frame. The computing device then performs a left shift to update the MFCC matrix such that an i-th column of the MFCC matrix becomes an (i−1)-th column of the MFCC matrix and such that the last column of the MFCC matrix includes new coefficients associated with new audio features corresponding to the new audio frame. The computing device updates the MFCC_0 buffer based on the MFCC matrix accordingly. The computing device updates a temporal mean value of a first element of the MFCC_0 buffer. The computing device also determines a max value of a subset of the MFCC_0 buffer. Next, the computing device determines that the trigger condition is satisfied based on the temporal mean value and the max value. In some embodiments, the subset of the MFCC_0 buffer includes the first n elements of the MFCC_0 buffer, and n is a positive integer. In one embodiment, n is 6.

In some embodiments, to determine that the trigger condition is satisfied based on the temporal mean value and the max value, the computing device determines that each elements of the MFCC_0 buffer preceding a max element of the MFCC_0 buffer exceeds an energy threshold. The max element is the element of the MFCC_0 buffer having the max value of the subset of the MFCC_0 buffer.

In some embodiments, to determine that the trigger condition is satisfied based on the temporal mean value and the max value, the computing device further determines that a gap value between the max value and the temporal mean value exceeds a gap threshold.

In some embodiments, the computing device receives a second new audio frame. The computing device performs a second left shift to update the MFCC matrix based on the second new audio frame. The computing device updates the MFCC_0 buffer based on the updated MFCC matrix accordingly. Then, the computing device determines that the trigger condition is not satisfied. In response, the computing device discards the updated MFCC matrix for the neural network to make the keyword inference. In some embodiments, the MFCC matrix and the MFCC_0 buffer are updated every 32 milliseconds (ms).

Computing devices, as well as computer program products, for performing the methods are also provided.

The foregoing has outlined rather broadly the features of an embodiment of the present disclosure in order that the detailed description of the disclosure that follows may be better understood. Additional features and advantages of embodiments of the disclosure will be described hereinafter, which form the subject of the claims of the disclosure. It should be appreciated by those skilled in the art that the conception and specific embodiments disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims

BRIEF DESCRIPTION OF THE DRAWINGS

For a more complete understanding of the present disclosure, and the advantages thereof, reference is now made to the following descriptions taken in conjunction with the accompanying drawings, in which:

FIG. 12 shows some values associated with the MFCC_0 buffer;

FIG. 13 illustrates a block scheme for finding the starting point of a potential pronouced word, according to some embodiments;

Corresponding numerals and symbols in the different figures generally refer to corresponding parts unless otherwise indicated. The figures are drawn to clearly illustrate the relevant aspects of the embodiments and are not necessarily drawn to scale

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Conventional KWS systems often utilize a 5-stage KWS pipeline. A classical KWS pipeline may include an advanced front end unit, a voice activity detector unit, a feature extraction unit, an inference unit, and an inference post processing unit. With the conventional techniques, the inference unit (e.g., a neural network model) must be continuously called to look for a pronouced keyword. So, the number of false positives using the conventional techniques is very high. Such high number of false positives impacts the overall performance and the power consumption of the KWS systems because the inference unit needs to constantly process audio features of the false positives provided to the inference unit.

Figure 1:
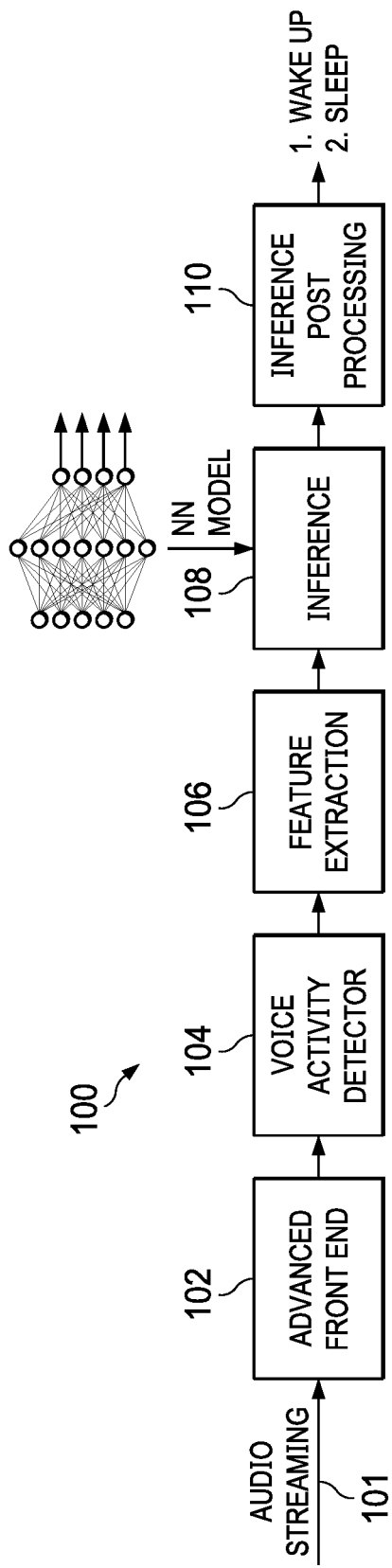
FIG. 1 illustrates a high level block diagram of a classical 5-stage KWS pipeline.

FIG. 1 shows a high level block diagram of a classical KWS pipeline 100. The classical KWS pipeline 100 has five stages, including an advanced front end unit 102, a voice activity detector unit 104, a feature extraction unit 106, an inference unit 108, and an inference post processing unit 110. After the microphones of the computing device collect audio streaming 101, the audio streaming 101 is first processed by the advanced front end unit 102. The advanced front end unit 102 performs algorithms such as beamforming and source localization on the audio streaming 101. The voice activity detector 104 discriminates speech against no speech in the audio streaming 101 after the processing by the advanced front end unit 102.

The feature extraction unit 108 takes the output of the voice activity detector 104 and generates a representation of the audio streaming 101 into audio features. The inference unit 108 is usually a neural network model that determines what keywords have been spotted based on the audio features from the feature extraction unit 108. A neural network is a series of algorithms used for recognizing patterns (e.g., underlying relationships in a set of data) through a process that mimics the way the human brain operates.

The last stage of the classical KWS pipeline 100 is the inference post processing unit 110. The inference post processing unit applies meta filtering to the output from the inference unit 108 to make the output of the KWS pipeline 100 more robust.

As explained above, the conventional systems using the classical 5-stage KWS pipeline suffer technical problems with respect to accuracy, performance, and power consumption. The disclosed embodiment techniques in this application improve the application of KWS in these aspects. The disclosed embodiment techniques help increase the KWS accuracy by reducing the number of false positives (filtering noisy environments). The increased accuracy is also due to the fact that the trigger intercepts the starting point of a potential word. So, audio features corresponding to a more suitable audio buffer are passed to the neural network model. The inference by the neural network model is performed only when the trigger is "on," which significantly reduces the latency (32 ms in a worst case scenario). The usage of the disclosed embodiment techniques can reduce the power consumption as compared to the conventional KWS techniques through, for example, the removal the post processing meta filter.

According to embodiments, the disclosed techniques drastically reduce the occurrence of the false positives caused by the noise. The disclose techniques utilize a trigger to the KWS. The trigger takes into account the level of environmental noise. The trigger is "on" when the starting point of a potential word pronounced by a user in the audio streaming is detected; otherwise, the trigger is "off." The detection of a starting point of a potential word is an important aspect of the false positive reduction because a "good" audio buffer is passed to the neural network for making the keyword spotting inference.

The disclosed trigger techniques are different from a voice activity detector in a conventional KWS pipeline, such as the voice activity detector 104 in FIG. 1. The voice activity detector is often used to discriminate "speech" from "no speech." Here, the discrimination of "speech" from "no speech" means discrimination of "voice" from "no voice," which does not take into account the environmental noise.

So, the voice activity detector performs poorly in discriminating "word" from "no word."

Figure 2:
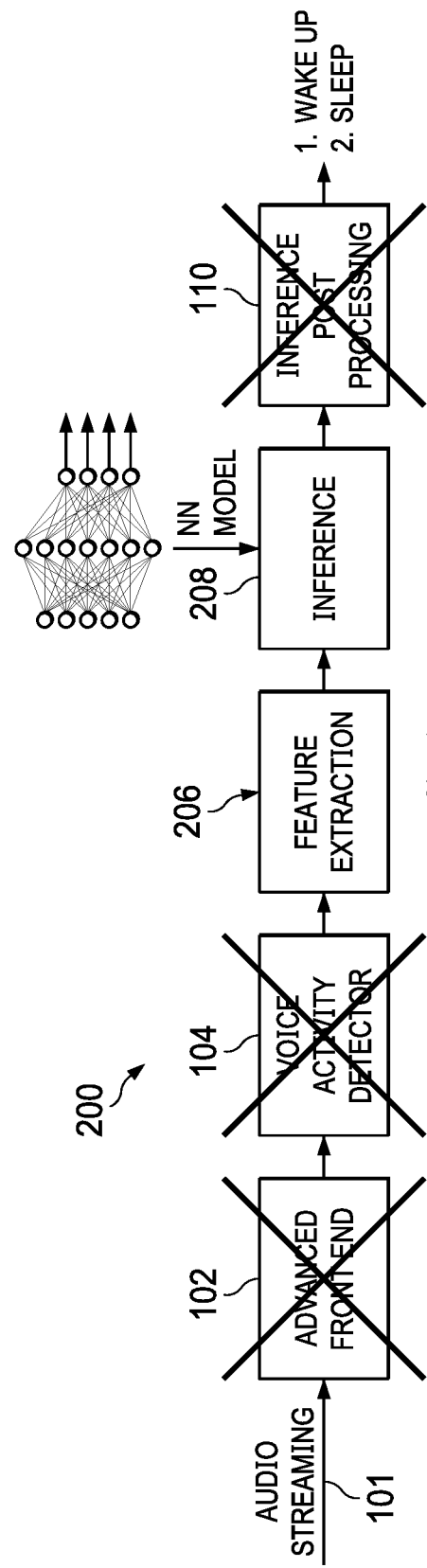
FIG. 2 shows a high level block scheme 200 of the disclosed techniques, according to some embodiments.

FIG. 2 illustrates a high level block scheme 200 of the disclosed techniques, according to some embodiments. The scheme 200 includes a feature extraction unit 206 and an inference unit 208. The feature extraction unit 206 is modified to include the trigger technique. In some embodiments, the inference unit 208 may be the same as a conventional inference unit known in the art, such as the inference unit 108 described with respect to FIG. 1. In other embodiments, the inference unit 208 may be an improved inference unit, such as the one described in Italian Patent Application No. 102019000015506. The advanced front end unit 102, the voice activity detector unit 104, and the inference post processing unit 110 are not needed by the embodiment techniques and may be eliminated from the scheme 200. With the scheme 200, the audio streaming 101 is first processed by the feature extraction unit 206.

The scheme 200 may be applied to an edge computing device using only one microphone to capture the audio streaming. With one microphone, the advanced front end processing is not needed because beamforming or source localization operations do not need to be performed. The trigger technique incorporated in the feature extraction unit 206 eliminates the need for the activity detector, particularly for an edge computing device with limited memory and power resources. The trigger technique incorporated in the feature extraction unit 206 also provides the pre-processing feature which allows removal of the last stage of the classical KWS pipeline, such as the stage performed by the inference post processing 110 of the classical KWS pipeline.

Figure 3:
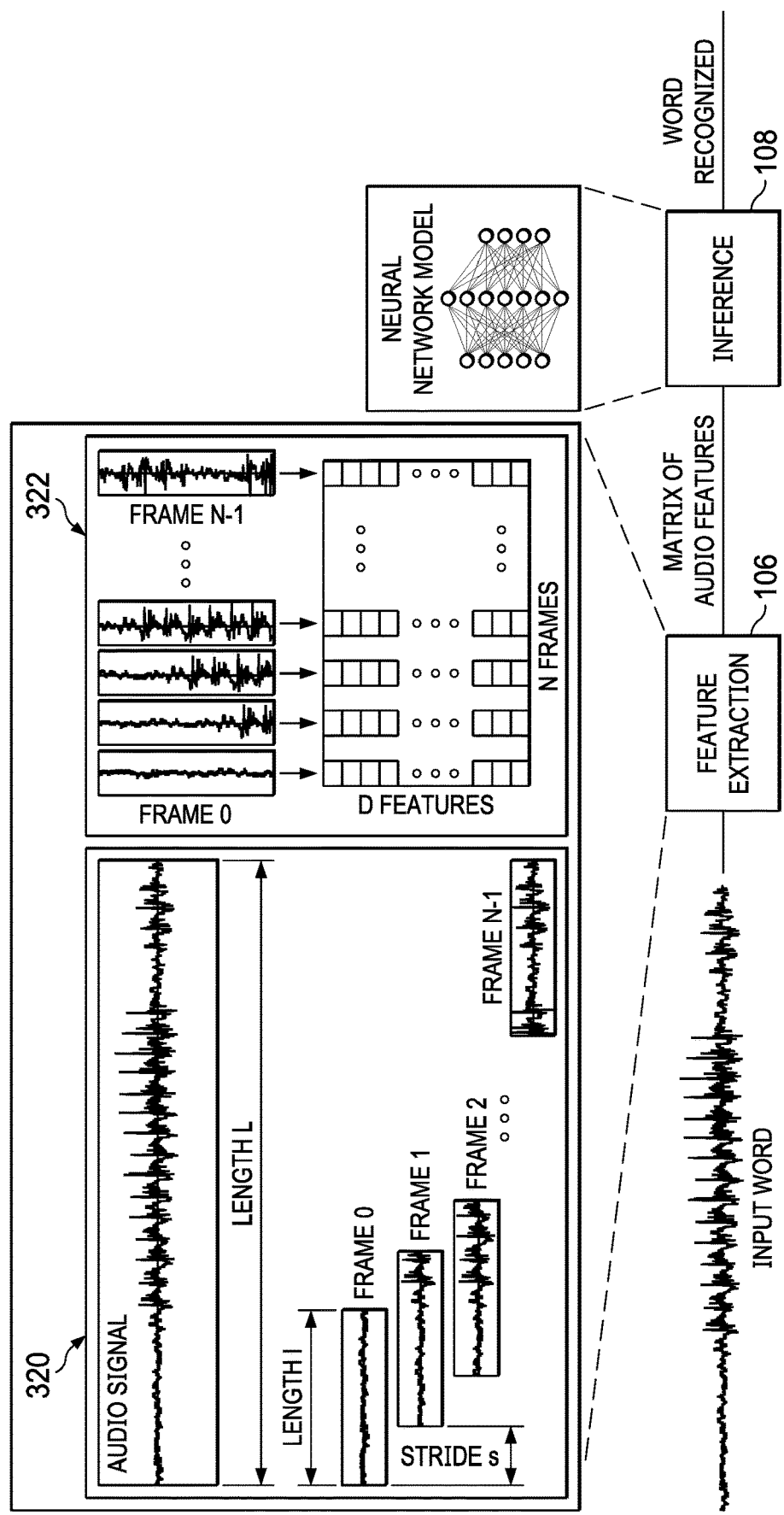
FIG. 3 shows a conventional technique of framing used to extract audio features from the audio streaming.

FIG. 3 shows a conventional technique of framing used to extract audio features from the audio streaming. The feature extraction unit 106 segments an audio signal 320 into a plurality of N audio frames (labelled as frames 0, 1, 2, . . . , and N−1). An audio frame may have an overlapping portion with its immediate succeeding audio frame. The non-overlapping portion of the audio frame is called a stride. From the N audio frames, the feature extraction unit 106 generates a D×N Mel Frequency Cepstral Coefficients (MFCC) matrix 322. Each element in the MFCC matrix is a coefficient representing an audio feature. A different column of the MFCC matrix corresponds to a different audio frame. A different row of the MFCC matrix representing a different type of audio features. For example, the first row of the MFCC matrix includes coefficients representing the power features of the audio frames. So, the first element of the first column of the MFCC matrix (MFCC[0][0]) is a coefficient representing the power feature of the first audio frame (frame 0). Techniques for generating an MFCC matrix from the audio frames are known in the art. The extracted features (i.e., the MFCC matrix) are the input to the neural network model of the inference unit 108. The inference unit 108 outputs the word recognized, which may be processed by an inference post processing unit.

Figure 4:
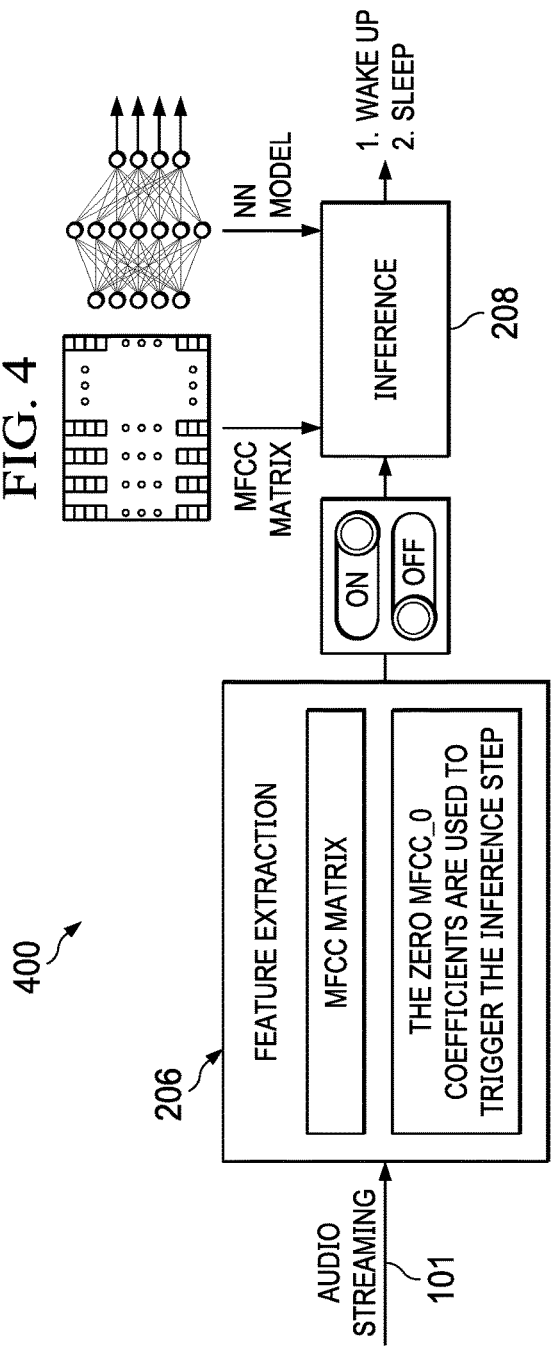
FIG. 4 shows a block scheme of the disclosed techniques, according to some embodiments.

FIG. 4 illustrates a block scheme 400 of the disclosed techniques, according to some embodiments. FIG. 4 provides a more detailed view of the feature extraction unit 206 with the embodiment trigger techniques. The audio streaming 101 is first processed by the feature extraction unit 206. As shown, the embodiment techniques use the row[0] coefficients (i.e., the first row) of the MFCC matrix to trigger the inference unit 208. When the trigger is "on," the MFCC matrix is passed to the inference unit 208. When the trigger is "off," the MFC matrix is not passed to the inference unit 208.

Figure 5:
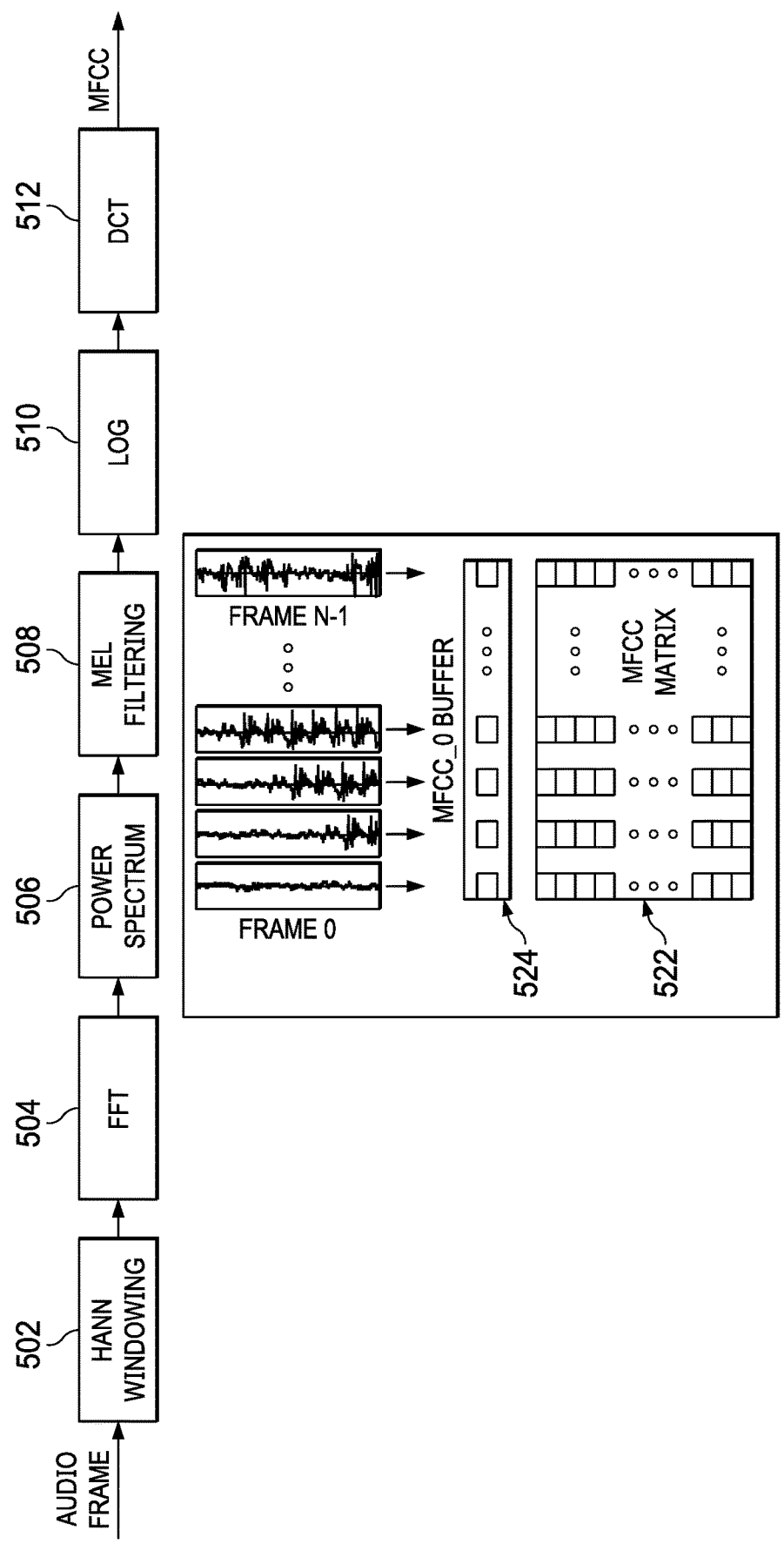
FIG. 5 illustrates more details of how the MFCC matrix is used for the trigger techniques, according to some embodiments.

FIG. 5 shows more details of how the MFCC matrix is used for the trigger techniques, according to some embodiments. As described above, techniques for generating an MFCC matrix from audio frames are known. For instance, an audio frame may be processed through the Hann windowing operation 502, the fast Fourier transform (FFT) operation 504, the power spectrum operation 506, the Mel filtering operation 508, the log operation 510, and the discrete cosine transform (DCT) operation 512 to generate the corresponding column in the MFCC matrix.

The first row (row[0]) of the MFCC matrix 522 represents the power features of the corresponding frames 0, 1, 2, . . . , (N−1). For the ease of explanation, the first row of the MFCC matrix 522 is named as the MFCC_0 buffer 524. So, the MFCC_0 buffer 524 may be a part of the MFCC matrix 522. In another embodiment, the MFCC_0 buffer 524 may be a separate buffer containing copies of the coefficients from the first row of the MFCC matrix 522. As the MFCC matrix 522 changes, the MFCC_0 buffer 524 changes accordingly. The conventional KWS systems typically do not use the MFCC_0 buffer 524. In contrast, with the embodiment techniques, the MFCC_0 buffer 524 provides crucial information for determining the trigger condition ("on" v. "off").

The MFCC matrix 522 changes over time when new audio buffers come in. For example, at time T(i), the MFCC matrix 522 includes N columns, column[0], column[1], . . . , and column[N−1]. At time T(i+1), a new audio buffer comes in. Consequently, the frames are left shifted. That is, frame 0 at T(i) is out at T(i+1). frame 1 at T(i) becomes frame 0 at T(i+1), frame 2 at T(i) becomes frame 1 at T(i+1), . . . , and frame (N−1) at T(i) becomes frame [N−2] at T(i+1). The new audio buffer becomes a last frame (frame (N−1)) at T(i+1). Accordingly, the MFCC matrix 522 is updated by a left shift. That means, column[0] at T(i) is shifted out at T(i+1). Column[1] at T(i) becomes column[0] at T(i+1). Column[2] at T(i) becomes column[1] at T(i+1), . . . , and column[N−1] at T(i) becomes column [N−2] at T(i+1). The last column, column[N−1] at T(i+1) includes coefficients representing audio features corresponding the new frame[N−1] at T(i+1).

Because the MFCC_0 buffer 524 is the first row of the MFCC matrix 522, the MFCC_0 buffer 524 is updated by a left shift accordingly when the MFCC matrix 522 is updated. The first element of the MFCC_0 buffer 524 (MFCC_0[0]) is shifted out at T(i−1). MFCC_0 [1] at T(i) becomes MFCC_0 [0] at T(i+1). MFCC_0 [2] at T(i) becomes MFCC_0[1] at T(i+1), . . . , and MFCC_0 [N−1] at T(i) becomes MFCC_0[N−2] at T(i+1). MFCC_0 [N−1] at T(i+1) holds the first coefficient of the new column[N−1] at T(i+1).

Figure 6:
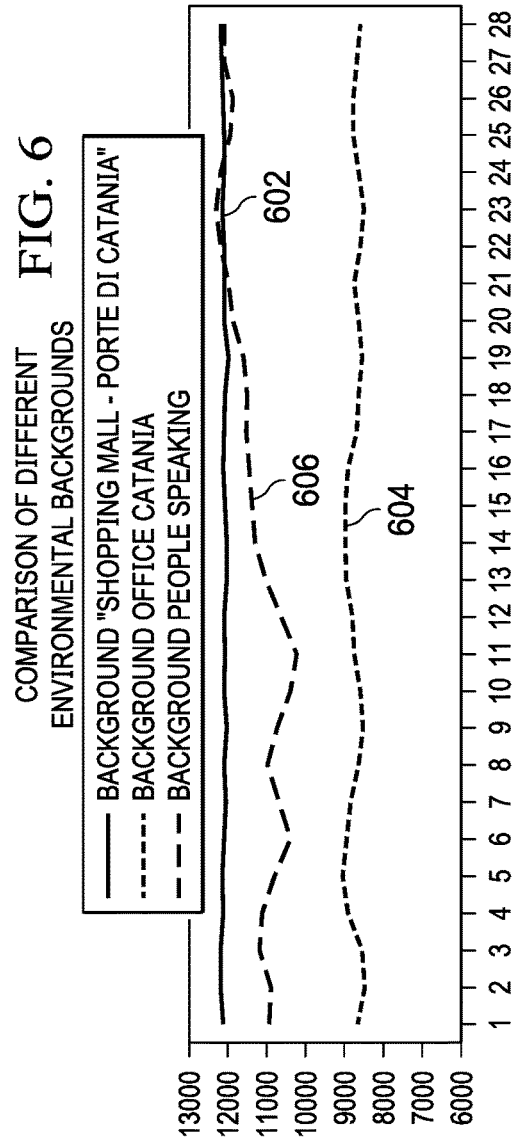
FIG. 6 illustrates the temporal means of the MFCC_0 buffer for different background representations.

FIG. 6 shows the temporal means of the MFCC_0 buffer for different background representations. The temporal means of the MFCC_0 buffer is realiable information representing the average power of the audio signal in an environment. The line 602 represents the temporal means of the MFCC_0 buffer for a shopping mall background. The line 606 represents the temporal means of the MFCC_0 buffer for an office background that is relatively quiet. The line 604 represents the temporal means of the MFCC_0 buffer for an office background with different office workers talking to one another. FIG. 6 illustrates that the shopping mall environment has a higher mean power of the audio signal compared to the one of the office.

Figure 7:
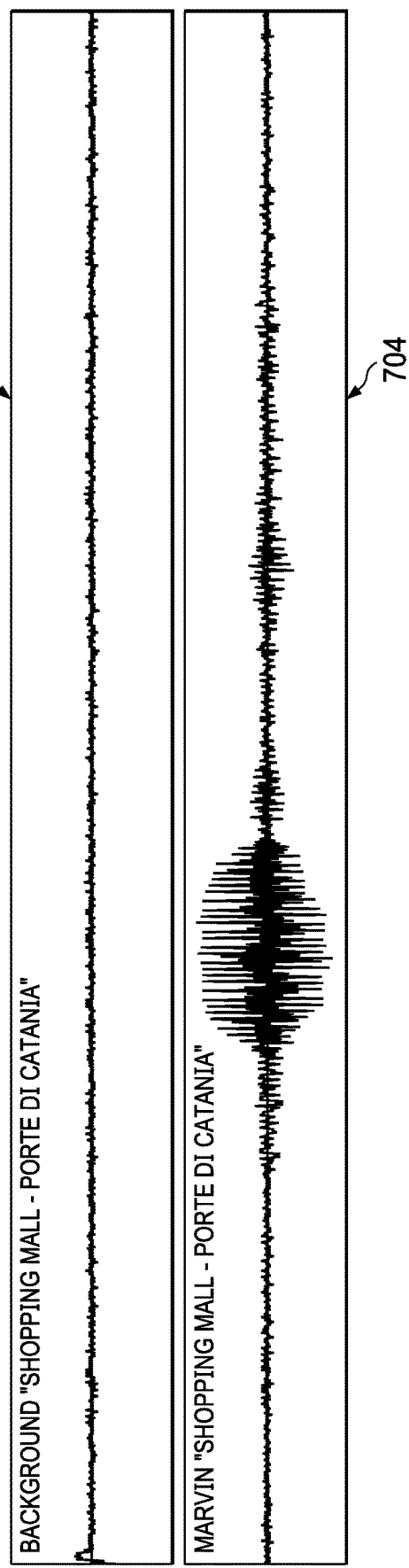
FIG. 7 illustrates the differences between two audio patterns that help detection of the start of a word in a noisy environment.

FIG. 7 shows the differences between two audio patterns that help the detection of the start of a word in a noisy environment. The pattern 702 represents a audio pattern corresponding to a shopping mall environment. The pattern 704 prepresents an audio pattern corresponding to a word ("Marvin") pronounced in a shopping mall environment.

Figure 8:
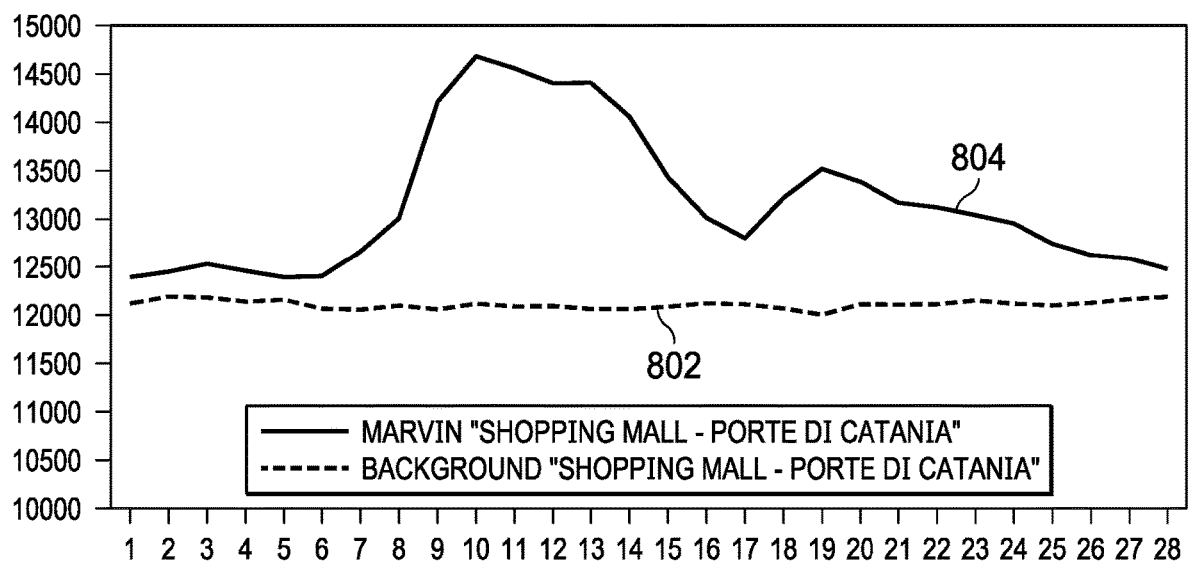
FIG. 8 illustrates the differences between the temporal means that help the detection of the start of a word in a noisy environment.

FIG. 8 shows the differences between the temporal means that help the detection of the start of a word in a noisy environment. The line 802 represents the temporal means of the MFCC_0 buffer that corresponds to the audio pattern 702 in FIG. 7 (i.e., the audio pattern for a shopping mall environment). The line 804 represents the temporal means of the MFCC_0 buffer that corresponds to the audio pattern 704 in FIG. 7 (i.e., the audio pattern for the word "Marvin" pronounced in a shopping mall environment). FIG. 8 illustrates how the mean power of the audio signal of a pronounced word increases over the mean power of the background noise.

Figure 9:
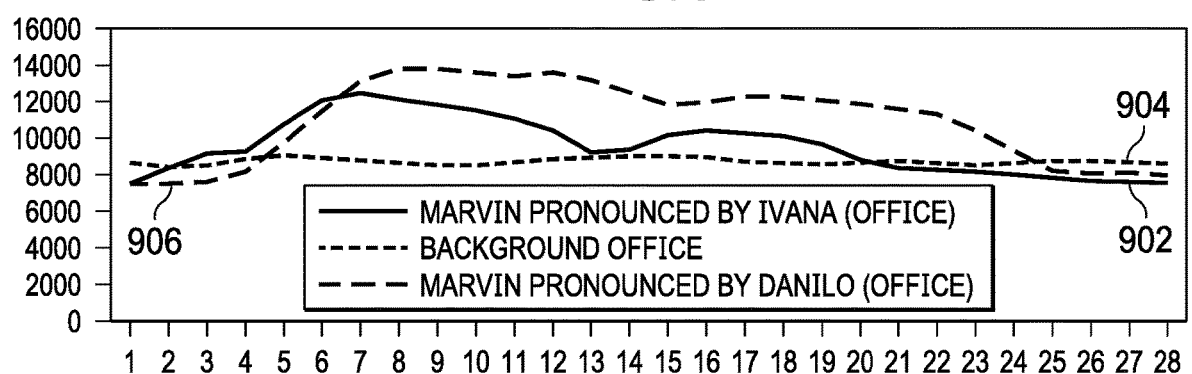
FIG. 9 illustrates the temporal mean powers associated with different speakers as compared to the temporal mean powers associated with a relative silent environment.

FIG. 9 shows the temporal mean powers associated with different speakers as compared to the temporal mean powers associated with a relative silent environment (e.g., an office). The line 902 shows the temporal mean powers associated with an office background. The line 904 shows the temporal mean powers associated with the word "Marvin" pronounced by one person (Ivana) in the office background. The line 904 shows the temporal mean powers associated with the word "Marvin" pronounced by a different person (Danilo) in the office background.

Figure 10:
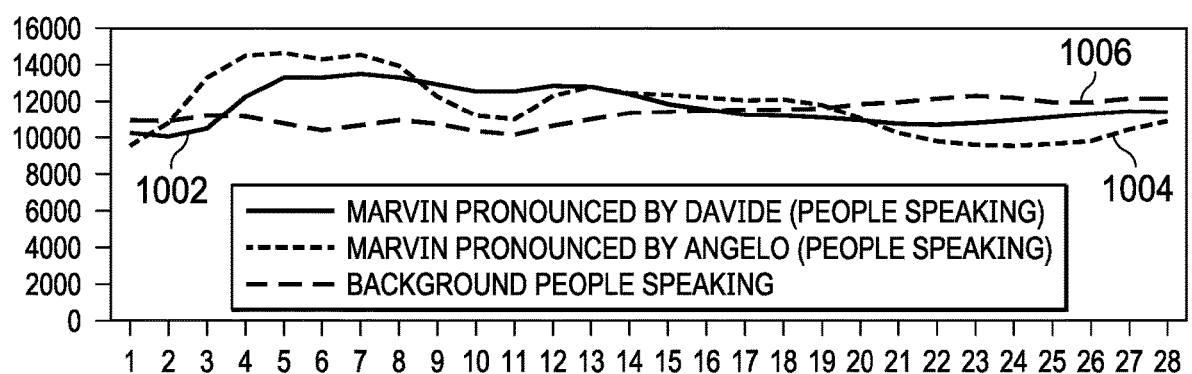
FIG. 10 illustrates the temporal mean powers associated with different speakers as compared to the temporal mean powers associated with a critical background.

FIG. 10 shows the temporal mean powers associated with different speakers as compared to the temporal mean powers associated with a critical background (e.g., people speaking in the background). The line 1002 shows the temporal mean powers associated with the word "Marvin" pronounced by one person (Davide) with the background of other people talking. The line 1004 shows the temporal mean powers associated with the word "Marvin" pronounced by another person (Angelo) with the background of other people talking. The line 1006 shows the temporal mean powers associated with the background of other people talking. FIG. 10 shows one of the more difficult situation for keyword spotting because it is harder to discriminate the pronunciation of a keyword (e.g., "Marvin") with respect to the critical background (e.g., other people speaking).

According to embodiment techniques, a new audio buffer may be available periodically. In one embodiment, a new buffer is available every 32 milliseconds (ms). When a new audio buffer is available, the MFCC matrix and the MFCC_0 buffer are updated by the left shift operations as described above. The temporal mean value of the MFCC_0 buffer is updated (using only the first element of the MFCC_0 buffer, MFCC_0[0]). According to some embodiments, at time T(0), the temporal mean value is MFCC_0[0]. At time T(1), the temporal mean value is (MFCC_0[0] at T(0)+MFCC_0 [0] at T(1))/2. At time T(1), the temporal mean value is (MFCC_0[0] at T(0)+MFCC_0[0] at T(1)+ . . . +MFCC_0 [0] at T(i))/(i+1). At time T(i+1), the temporal mean value is (MFCC_0[0] at T(0)+MFCC_0[0] at T(1)+ . . . +MFCC_0 [0] at T(i)+MFCC_0[0] at T(i+1))/(i+2).

According to some other embodiments, the temporal mean value (M) of the MFCC_0 buffer may first be initialized with a predetermined initialization value. The initialization value may be derived from tests and experienpiments. The For example, M may be initialized with Minit=9500 because tests have shown this initialization value represents well the mean value of the signal energy in the case of a quiet background environment, such as a home or an office.

In these embodiments, the updating of the temporal mean value (M) only starts after the MFCC_0 buffer is completely filled. For example, if a new column of the MFCC matrix is available every 32 ms and the MFCC matrix has 28 columns, 32×28 ms is needed to fill the MFCC_buffer. That means, it takes time T(0) to time T(27) to fill the MFCC_0 buffer. Updating the temporal mean value (M) starts at time T (28). For the ease of explanation, M(i) represents the temporal mean value at time T(i).

At T(28), M(28)=(Minit+MFCC_0[0])/2. At T(29), after a left shift of the MFCC_0 buffer, M(29)=(M(28)+MFCC_0 [0])/2. At T(i), after a left shift of the MFCC_0 buffer, M(i)=(M(i-1)+MFCC_0[0])/2. The process goes on as new audio buffers are available.

After a left shift, the max value of a subset of the MFCC_0 buffer is also computed. In some embodiments, if the MFCC_0 buffer has N elements, the max value of the first n elements is of the MFCC_0 is determined (n<N). Then, the edge computing device determines whether a trigger condition is satisfied based on the temporal mean value of the MFCC[0], the max value, and a slope evaluated on the MFCC[0].

In some embodiments, if there are two elements of the subset of the MFCC_0 buffer having the same max value, the elements preceding the first max element just evaluate the elements preceding the first max element. For example, when n is 6, if the first 6 elements of the MFCC_0 buffer are:
MFCC_0[0]=10500,
MFCC_0[1]=12500,
MFCC_0[2]=13000,
MFCC_0[3]=14500,
MFCC_0[4]=13800, and
MFCC_0[5]=14500,
the max element is MFCC_0[3], and the elements before MFCC_0[3] are evaluated.

Figure 11:
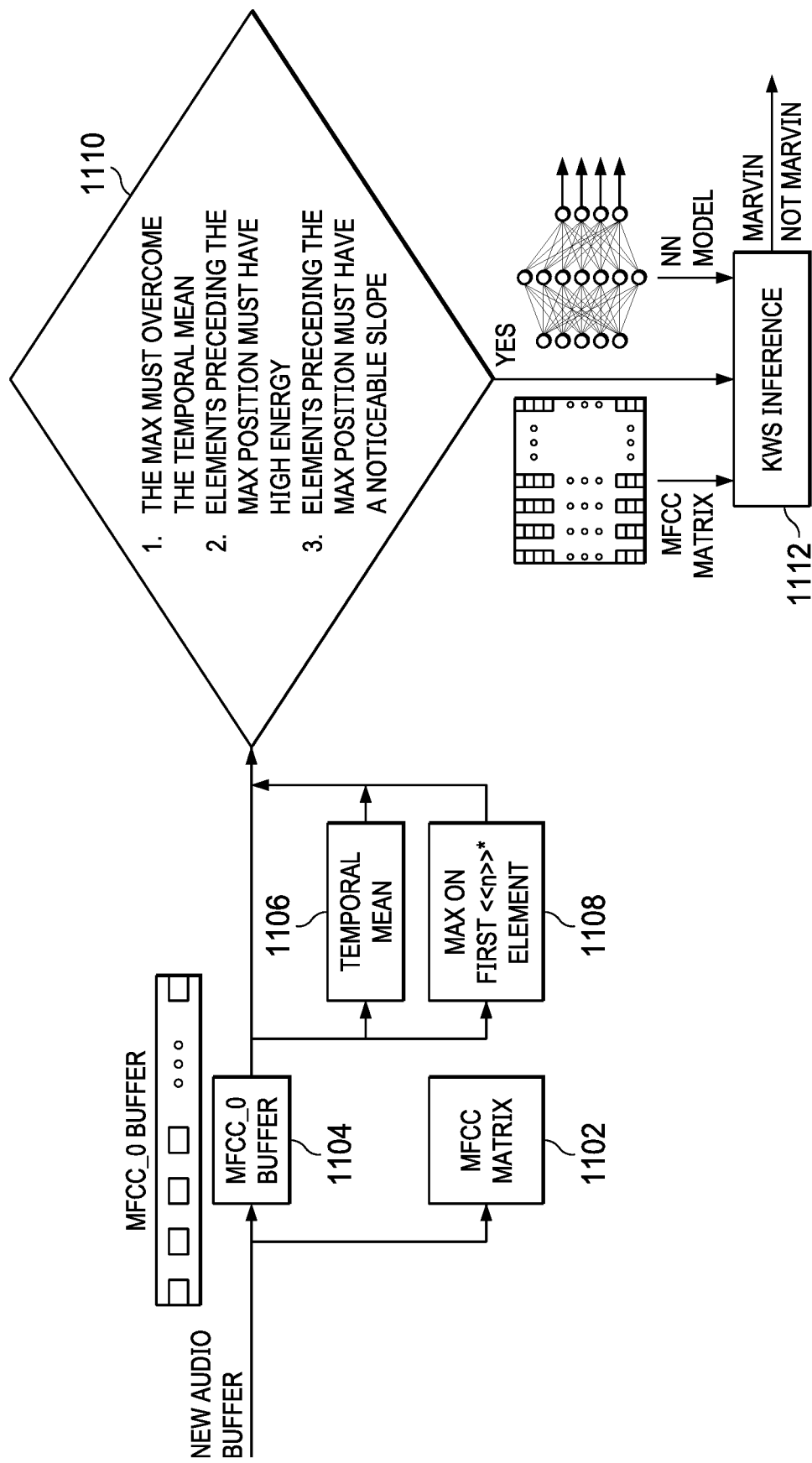
FIG. 11 shows a block scheme of the trigger technique for KWS, according to some embodiments.

FIG. 11 is a block scheme of the trigger technique for KWS, according to some embodiments. When a new audio buffer becomes available, the MFCC matrix is updated through the left shift at the block 1102. The MFCC_0 buffer is updated through the left shift accordingly at the block 1104. At the block 1106, the temporal mean value of the MFCC_0[0] is updated. At the block 1108, the max value of a subset of the MFCC_0 buffer is determined. In one embodiment, the max value of the first 6 elements of the MFCC_0 buffer is determined at the block 1108.

At the block 1110, the edge computing device determines whether a trigger condition is satisfied based on several requirements. First, the max value of the subset of the MFCC_0 buffer must overcome the temporal mean value of the MFCC_0[0]. Second, elements of the MFCC_0 buffer preceding the max element must have high energy (e.g., greater than an energy threshold). The max element is the element in the first n elements of the MFCC_0 buffer that has the max value. For example, when n is 6, the subset of the MFCC_0 buffer is MFCC_0[0], MFCC_0[1], MFCC_0 [2], MFCC_0[3], MFCC_0[4], MFCC_0[5]. If MFCC_0[3] has the max value among MFCC_0[0] to MFCC_0[5], MFCC_0[3] is the max element. So, MFCC_0[0], MFCC_0 [1], and MFCC_0[2] (the elements before MFCC_0[3]) must exceeds the energy threshold.

Third, the elements preceding the max element must have a noticeable slope. The slope threshold may be empirically computed. In some embodiments, a more accurate way to determine the slope may be computing the slope of the line passing through values between MFCC_0[0] and the computed max. The line can be the results of an interpolation method. In other embodiments, to save computing resources, the slope may be computed as a gap, ((the max value-the temporal mean value)>gap threshold). The gap threshold may be empirically computed. At the block 1112, if the trigger condition is satisfied, the MFCC matrix is provided to the inference unit for keyword spotting (e.g., determining whether the word "Marvin" is pronounced). If the trigger is not satisfied, the MFCC matrix is not provided to the inference unit for keyword spotting. In FIG. 11, the MFCC matrix is provided to the neural network for keyword spotting. In other embodiments, the MFCC matrix may be provided to other keyword spotting techniques that are not based on the neural network model.

FIG. 12 shows some values associated with the MFCC_0 buffer. The line 1204 illustrates the temporal mean values of the MFCC_0 buffer 1202 for a shopping mall background. The line 1206 illustrates the current values of the MFCC_0 buffer 1204. The line 1206 represents current values stored in the MFCC_0 buffer when a person pronounces the keyword "Marvin" in a shopping mall center (i.e., the same shopping mall where the temporal mean value is computed, as represented in the line 1204). Data of the MFCC_0 buffer and data of the MFCC matrix are left shifted every time a new audio buffer is available. In one embodiment, a new audio buffer is available every 32 ms. In other embodiments, the period may be shorter or longer than the 32 ms. The temporal mean value is computed on the first element of the MFCC_0 buffer (MFCC_0[0]). The max value of first n elements of the MFCC_0 buffer is also computed. The window size (n) (i.e., the number of elements of the MFCC_0 buffer used for determining the max value) may be a predetermined number (e.g., 6). The window size (n) may also be heuristically determined. In some embodiments, the window size (n) may be calibrated according to the specific shape of the word or to the specific noise event to be detected. The window size (n) may be determined based on how frequent a new buffer becomes available. For example, if the MFCC matrix and the MFCC_0 buffer are updated every 32 ms, n may be 6. if the MFCC matrix and the MFCC_0 buffer are updated every 16 ms, n may be a value different from 6.

FIG. 13 shows a block scheme for finding the starting point of a potential pronouced word, according to some embodiments. When a new audio buffer is available, the MFCC matrix and the MFCC_0 buffer are left shifted. At the block 1306, the temporal mean value of the first element of the MFCC_0 buffer (MFCC_0[0]) is updated. At the block 1308, the max value of the first n elements of the MFCC_0 buffer is calculated. At the block 1310, the starting point of a potential word is detected. In some embodiments, the starting point of a potential word is detected when the requirements for the trigger condition, such as the ones described with respect to the block 1110 of FIG. 11, are met. That means, when the trigger condition is satisfied, the MFCC matrix passed to the inference unit for keyword inference at the block 1312 corresponds to an audio signal for a starting point of a potential word. Passing the MFCC matrix corresponding to the starting point of a potential word to the inference unit significantly improves the accuracy of the keyword spotting at the block 1312.

Figure 14:
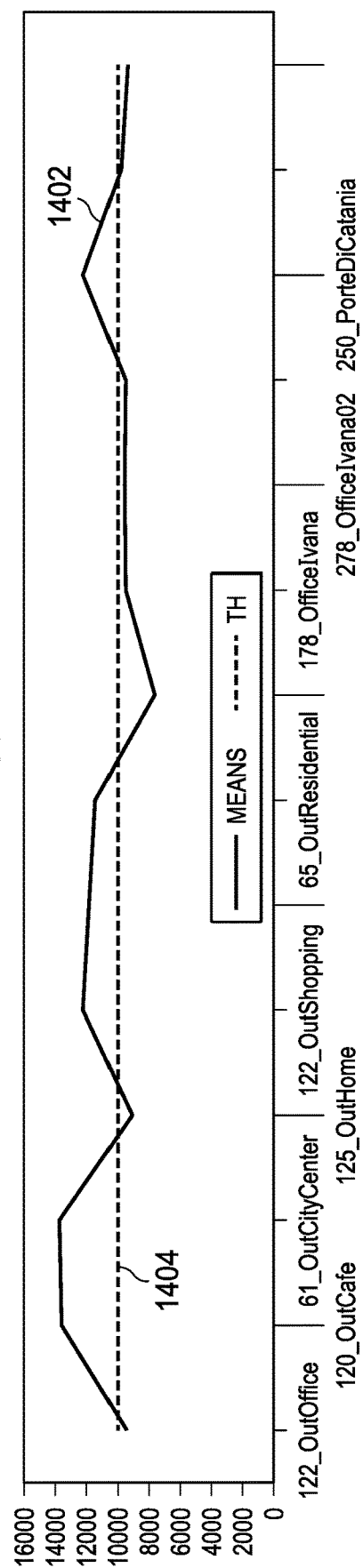
FIG. 14 illustrates the temporal mean values on long audio sequences.

FIG. 14 shows the temporal mean values on long audio sequences. The figure illustrates the temporal mean values computed on long audio sequences recorded in different background environments. The line 1402 shows the temporal mean values of the MFCC_0[0] over different background environments. The line 1404 shows the threshold values over different background environments. Such analysis may be used to empirically determine the threshold values (e.g., the gap threshold value and the energy threshold value) described above.

Figure 15:
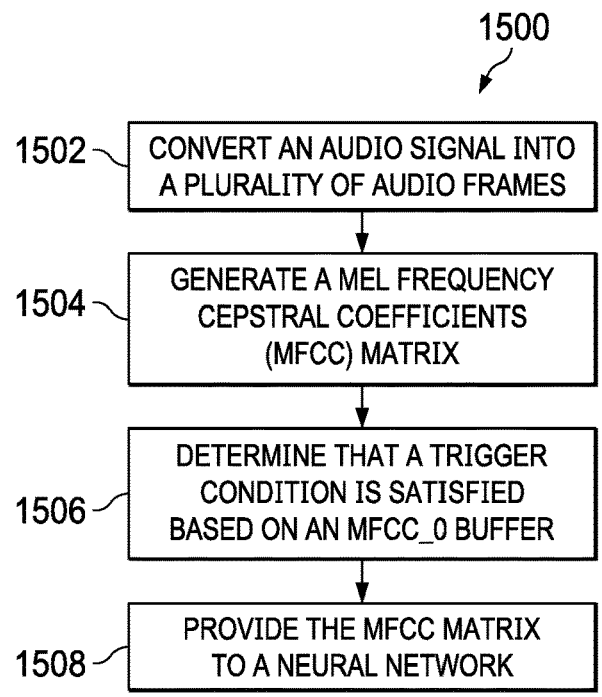
FIG. 15 illustrates a flowchart of a method utilizing the trigger techniques for KWS, according to some embodiments.

FIG. 15 illustrates a flowchart of a method utilizing the trigger techniques for KWS, according to some embodiments. The method 1500 may be carried out or performed by routines, subroutines, or modules of software executed by one or more processors of a computing device, such as an edge computing device. Coding of the software for carrying out or performing the method 1500 is well within the scope of a person of ordinary skill in the art having regard to the present disclosure. The method 1500 may include additional or fewer operations than those shown and described and may be carried out or performed in a different order. Computer-readable code or instructions of the software executable by the one or more processor of the computing device may be stored on a non-transitory computer-readable medium, such as for example, memory of the computing device. The method 1500 may also be implemented using hardware technologies such as ASIC (application-specific integrated circuit) or FPGA (field-programmable gate array).

The method 1500 starts at the operation 1502, where the computing device converts an audio signal into a plurality of audio frames. At the operation 1504, the computing device generates a Mel Frequency Cepstral Coefficients (MFCC) matrix based on the plurality of audio frames. The MFCC matrix includes N columns. Each column of the N columns comprises coefficients associated with audio features corresponding to a different audio frame of the plurality of audio frames. At the operation 1506, the computing device determines that a trigger condition is satisfied based on an MFCC_0 buffer. The MFCC_0 buffer comprises a first row of the MFCC matrix. At the operation 1508, the computing device then provides the MFCC matrix to a neural network for the neural network to use the MFCC matrix to make keyword inference based on the determining that the trigger condition is satisfied In some embodiments, to determine that a trigger condition is satisfied, the computing device receives a new audio frame. The computing device then performs a left shift to update the MFCC matrix such that an i-th column of the MFCC matrix becomes an (i−1)-th column of the MFCC matrix and such that the last column of the MFCC matrix includes new coefficients associated with new audio features corresponding to the new audio frame. The computing device updates the MFCC_0 buffer based on the MFCC matrix accordingly. The computing device updates a temporal mean value of a first element of the MFCC_0 buffer. The computing device also determines a max value of a subset of the MFCC_0 buffer. Next, the computing device determines that the trigger condition is satisfied based on the temporal mean value and the max value. In some embodiments, the subset of the MFCC_0 buffer includes the first n elements of the MFCC_0 buffer, and n is a positive integer. In one embodiment, n is 6.

In some embodiments, to determine that the trigger condition is satisfied based on the temporal mean value and the max value, the computing device determines that each elements of the MFCC_0 buffer preceding a max element of the MFCC_0 buffer exceeds an energy threshold. The max element is the element of the MFCC_0 buffer having the max value of the subset of the MFCC_0 buffer.

In some embodiments, to determine that the trigger condition is satisfied based on the temporal mean value and the max value, the computing device further determines that a gap value between the max value and the temporal mean value exceeds a gap threshold.

In some embodiments, the computing device receives a second new audio frame. The computing device performs a second left shift to update the MFCC matrix based on the second new audio frame. The computing device updates the MFCC_0 buffer based on the updated MFCC matrix accordingly. Then, the computing device determines that the trigger condition is not satisfied. In response, the computing device discards the updated MFCC matrix for the neural network to make the keyword inference. In some embodiments, the MFCC matrix and the MFCC_0 buffer are updated every 32 ms.

The method 1500 may be performed by an edge computing device that includes one or more microphones, such as a mobile smart phone. In other embodiments, the method 1500 may be performed by a computing device without a microphone, such as a service computing device for processing audio signals transmitted from edge computing devices.

Embodiments of this disclosure describe trigger based techniques to the KWS for reducing false positives, reducing power consumption, and improving performance by reduction of latency. As described above, with the conventional techniques in absence of the trigger, the inference unit must be continuously called to look for a pronouced keyword. So, the high number of false positives using the conventional techniques impacts the performance and the power consumption of the KWS system because the inference unit still needs to process audio features of the false positives. In contrast, with the trigger based techniques described herein, the inference unit is only called when a specific trigger condition is satisfied, reducing significantly the rate of the false positives.

To satisfy the trigger condition, specific requirements must be met, including that the power of the audio input must be above the average power of the background sound/noise estimation. In addition, the trigger estimates the initial position on the input audio signal of a potential word. To intercept the initial position of the potential word means passing to the neural network model the most accurate segment of the audio features corresponding to the input audio signal to be classified as a keyword or not a keyword. These specific requirements decreases the false positive rate and increases the accuracy.

Embodiment techniques also reduce power consumption. The trigger to the KWS allows accurate detection of the audio segment that will be passed to the inference unit (e.g., the neural network). Due to the specificity of the requirements, post processing on successive inferences is not required. The handling of a set of successive inferences (e.g., the post processing) is generally used to make an output of the KWS more robust. This post processing step analyzes the temporal outputs of the neural network to apply a possible smoothing operation with the intention to better handle noise or false positives. Embodiment techniques allow the removal of the post processing, which reduces the power consumption of the overall KWS solution. Evaluating the trigger of the KWS requires fewer power consumption because the data in the MFCC_0 buffer is already available, and embodiment techniques only apply simple, low cost operations (e.g., mean, max, and checking the thresholds) on such data.

In addition, without the trigger to the KWS, it is necessary to call the inference unit in a continuous fashion according to a fixed timing. For example, in a conventional KWS system without the trigger, the inference unit may be called every 32 ms. That means, in 1 second of the audio streaming, the inference unit may be called 31.25 times (1000/96=31.25). So, resources need to be allocated to the inference unit 31.25 times per second. In contrast, with the embodiment trigger techniques to the KWS system, the inference unit is called once and produces one output only when the trigger detects a potential pronounced word.

Embodiment techniques also reduce latency. The latency in the KWS is the time from the moment when pronunciation of a keyword completes to when the KWS system produces the output detecting the keyword. The removal of any post processing of the outputs from the inference unit allows such reduction of latency. Moreover, using the trigger to the KWS system allows calling the inference unit once only when the trigger condition is satisfied, which avoids the additional time for processing a set of successive inferences and consequently reduces the latency.

Embodiment techniques using the trigger to the KWS can be helpful for hardware platforms equipped with only one microphone and low resources in terms of memory, CPU, and power consumption. Embodiment techniques reduce false positives caused by noisy environments and increase accuracy for KWS solutions. Embodiment techniques disable the KWS (e.g., the keyword inference by the neural network) when non-keyword sounds are detected. The KWS is enabled when an important sound (e.g., a potential pronouced keyword) are detected by the feature extraction unit 206. In this case, the audio features corresponding to a suitable audio segment (e.g., the starting point of a potential pronounced keyword) are passed to the neural network for inference.

In some embodiments, a neural network may be trained to learn the temporal mean values that characterize different environment types, such as hard noisy, quiet noisy, silence, etc. In some embodiments, the shape of the slope of a specific word or a specific noise type may be used as a new audio feature to train such neural network. This new audio feature may be used alone or together with the coefficients in the MFCC matrix.

The embodiment techniques may be used specifically for the KWS. In addition, the embodiment techniques may be generalized and used in other similar application fields, such as event sound detection.

Figure 16:
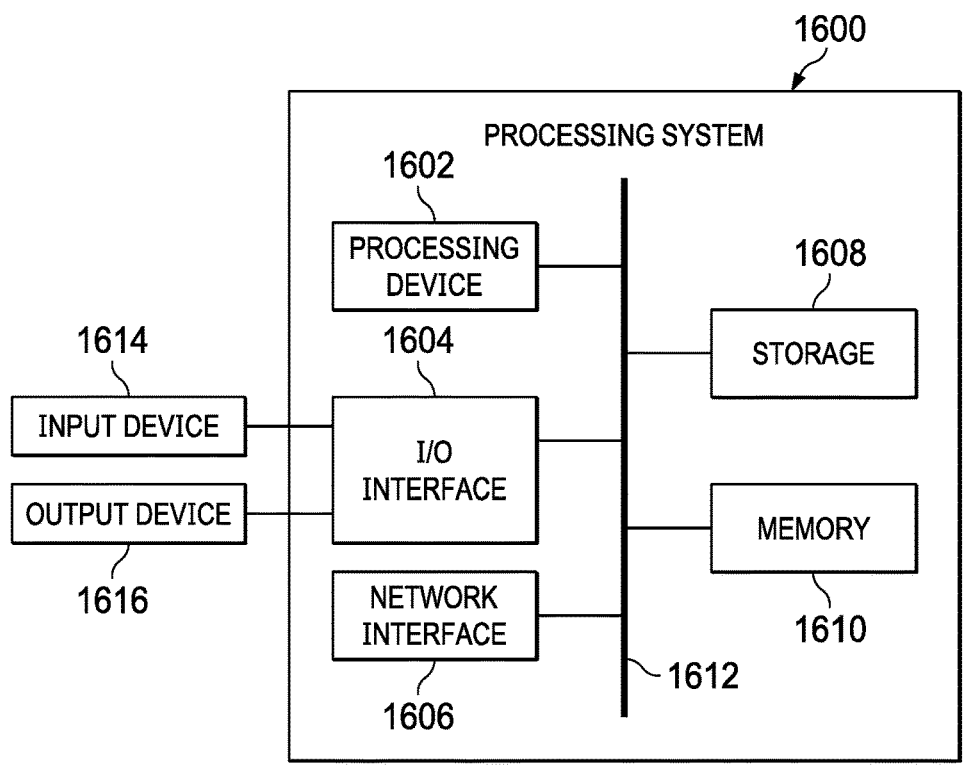
FIG. 16 is a block diagram of an example processing system used to implement the disclosed embodiments.

FIG. 16 is a block diagram of an example processing system 1600, which may be used to implement embodiments disclosed herein, and provides a higher level implementation example. The computing device as described above may be implemented using the example processing system 1600, or variations of the processing system 1600. Specific devices may utilize all of the components shown, or only a subset of the components and levels of integration may vary from device to device. The processing system 1600 could be a smart phone, a server, a desktop terminal, for example, or any suitable processing system. Other processing systems suitable for implementing embodiments described in the present disclosure may be used, which may include components different from those discussed below. Although FIG. 1600 shows a single instance of each component, there may be multiple instances of each component in the processing system 1600.

The processing system 1600 may include one or more processors 1602, such as a processor, graphics processing unit (GPU), a microprocessor, an application-specific integrated circuit (ASIC), a field-programmable gate array (FPGA), a dedicated logic circuitry, a tensor processing units (TPU), an artificial intelligence (AI) accelerator, or combinations thereof. The processing system 1600 may also include one or more input/output (I/O) interfaces 1604, which may enable interfacing with one or more appropriate input devices 1614 and/or output devices 1616. The processing system 1600 may include one or more network interfaces 1606 for wired or wireless communication with a network (e.g., an intranet, the Internet, a P2P network, a WAN and/or a LAN) or other node. The network interfaces 1606 may include wired links (e.g., Ethernet cable) and/or wireless links (e.g., one or more antennas) for intra-network and/or inter-network communications.

The processing system 1600 may also include one or more storage units 1608, which may include a mass storage unit such as a solid state drive, a hard disk drive, a magnetic disk drive and/or an optical disk drive. The processing system 1600 may include one or more memories 1610, which may include a volatile or non-volatile memory (e.g., a flash memory, a random access memory (RAM), and/or a read-only memory (ROM)). The non-transitory memory(ies) 1610 may store instructions for execution by the one or more processors 02, such as to carry out examples described in the present disclosure. The one or more memories 1610 may include other software instructions, such as for implementing an operating system and other applications/functions. In some examples, one or more data sets and/or modules may be provided by an external memory (e.g., an external drive in wired or wireless communication with the processing system 1600) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. There may be a bus 1612 providing communication among components of the processing system 1600, including the one or more processors 1602, I/O interface(s) 1604, network interface(s) 1606, storage unit(s) 1608, and the one or more memories 1610. The bus 1612 may be any suitable bus architecture including, for example, a memory bus, a peripheral bus or a video bus.

In FIG. 16, the input device(s) 1614 (e.g., a keyboard, a mouse, one or more microphones, a touchscreen, and/or a keypad) and output device(s) 1616 (e.g., a display, a speaker and/or a printer) are shown as external to the processing system 1600. In other examples, one or more of the input device(s) 1614 and/or the output device(s) 1616 may be included as a component of the processing system 1600. In other examples, there may not be any input device(s) 1614 and output device(s) 1616, in which case the I/O interface(s) 1604 may not be needed.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   converting, by a computing device, an audio signal into a plurality of audio frames;
   generating, by the computing device, a Mel Frequency Cepstral Coefficients (MFCC) matrix based on the plurality of audio frames, the MFCC matrix including N columns, each column of the N columns comprising coefficients associated with audio features corresponding to a different audio frame of the plurality of audio frames;
   determining, by the computing device, that a trigger condition is satisfied based on an MFCC_0 buffer, the MFCC_0 buffer comprising a first row of the MFCC matrix; and
   providing, by the computing device, the MFCC matrix to a neural network for the neural network to use the MFCC matrix to make keyword inference based on the determining.

2. The method of claim 1, the determining comprising:
   receiving a new audio frame;
   performing a left shift to update the MFCC matrix such that an i-th column of the MFCC matrix becomes an (i−1)-th column of the MFCC matrix and such that a last column of the MFCC matrix includes new coefficients associated with new audio features corresponding to the new audio frame;
   updating the MFCC_0 buffer based on the MFCC matrix;
   updating a temporal mean value of a first element of the MFCC_0 buffer;
   determining a max value of a subset of the MFCC_0 buffer; and
   determining that the trigger condition is satisfied based on the temporal mean value and the max value.

3. The method of claim 2, the determining that the trigger condition is satisfied based on the temporal mean value and the max value comprising:
   determining that each elements of the MFCC_0 buffer preceding a max element of the MFCC_0 buffer exceeds an energy threshold, the max element having the max value.

4. The method of claim 3, the determining that the trigger condition is satisfied based on temporal mean value and the max value further comprising:
   determining that a gap value between the max value and the temporal mean value exceeds a gap threshold.

5. The method of claim 2, further comprising:
   receiving a second new audio frame;
   performing a second left shift to update the MFCC matrix based on the second new audio frame;
   updating the MFCC_0 buffer based on the updated MFCC matrix;
   determining that the trigger condition is not satisfied; and
   discarding the updated MFCC matrix for the neural network to make the keyword inference.

6. The method of claim 2, wherein the subset of the MFCC_0 buffer includes a first 6 elements of the MFCC_0 buffer.

7. The method of claim 1, wherein the audio signal is collected from only one microphone of the computing device.

8. The method of claim 1, wherein the MFCC matrix and the MFCC_0 buffer are updated every 32 ms.

9. An apparatus comprising:
   one or more microphones;
   a memory;
   one or more processors coupled to the memory, the one or more processors configured to perform operations, the operations comprising:
   converting an audio signal into a plurality of audio frames;
   generating a Mel Frequency Cepstral Coefficients (MFCC) matrix based on the plurality of audio frames, the MFCC matric including N columns, each column of the N columns comprising coefficients associated with audio features corresponding to a different audio frame of the plurality of audio frames;
   determining that a trigger condition is satisfied based on an MFCC_0 buffer, the MFCC_0 buffer comprising a first row of the MFCC matrix; and providing the MFCC matrix to a neural network for the neural network to use the MFCC matrix to make keyword inference based on the determining.

10. The apparatus of claim 9, the determining comprising:
receiving a new audio frame;
performing a left shift to update the MFCC matrix such that an i-th column of the MFCC matrix becomes an (i−1)-th column of the MFCC matrix and such that a last column of the MFCC matrix includes new coefficients associated with new audio features corresponding to the new audio frame;
updating the MFCC_0 buffer based on the MFCC matrix;
updating a temporal mean value of a first element of the MFCC_0 buffer;
determining a max value of a subset of the MFCC_0 buffer; and
determining that the trigger condition is satisfied based on the temporal mean value and the max value.

11. The apparatus of claim 10, the determining that the trigger condition is satisfied based on the temporal mean value and the max value comprising:
determining that each elements of the MFCC_0 buffer preceding a max element of the MFCC_0 buffer exceeds an energy threshold, the max element having the max value.

12. The apparatus of claim 11, the determining that the trigger condition is satisfied based on the temporal mean value and the max value further comprising:
determining that a gap value between the max value and the temporal mean value exceeds a gap threshold.

13. The apparatus of claim 10, further comprising:
receiving a second new audio frame;
performing a second left shift to update the MFCC matrix based on the second new audio frame;
updating the MFCC_0 buffer based on the updated MFCC matrix;
determining that the trigger condition is not satisfied; and
discarding the updated MFCC matrix for the neural network to make the keyword inference.

14. The apparatus of claim 10, wherein the subset of the MFCC_0 buffer includes a first 6 elements of the MFCC_0 buffer.

15. The apparatus of claim 9, wherein the audio signal is collected from only one microphone of the one or more microphones.

16. The apparatus of claim 9, wherein the MFCC matrix and the MFCC_0 buffer are updated every 32 ms.

17. A non-transitory computer-readable medium having instructions stored thereon that, when executed by a computing device, cause the computing device to perform operations, the operations comprising:
converting an audio signal into a plurality of audio frames;
generating a Mel Frequency Cepstral Coefficients (MFCC) matrix based on the plurality of audio frames, the MFCC matrix including N columns, each column of the N columns comprising coefficients associated with audio features corresponding to a different audio frame of the plurality of audio frames;
determining that a trigger condition is satisfied based on an MFCC_0 buffer, the MFCC_0 buffer comprising a first row of the MFCC matrix; and
providing the MFCC matrix to a neural network for the neural network to use the MFCC matrix to make keyword inference based on the determining.

18. The non-transitory computer-readable medium of claim 17, the determining comprising:
receiving a new audio frame;
performing a left shift to update the MFCC matrix such that an i-th column of the MFCC matrix becomes an (i−1)-th column of the MFCC matrix and such that a last column of the MFCC matrix includes new coefficients associated with new audio features corresponding to the new audio frame;
updating the MFCC_0 buffer based on the MFCC matrix;
updating a temporal mean value of a first element of the MFCC_0 buffer;
determining a max value of a subset of the MFCC_0 buffer; and
determining that the trigger condition is satisfied based on the temporal mean value and the max value.

19. The non-transitory computer-readable medium of claim 18, the determining that the trigger condition is satisfied based on the temporal mean value and the max value comprising:
determining that each elements of the MFCC_0 buffer preceding a max element of the MFCC_0 buffer exceeds an energy threshold, the max element having the max value.

20. The non-transitory computer-readable medium of claim 19, the determining that the trigger condition is satisfied based on the temporal mean value and the max value further comprising:
determining that a gap value between the max value and the temporal mean value exceeds a gap threshold.

21. The non-transitory computer-readable medium of claim 18, further comprising:
receiving a second new audio frame;
performing a second left shift to update the MFCC matrix based on the second new audio frame;
updating the MFCC_0 buffer based on the updated MFCC matrix;
determining that the trigger condition is not satisfied; and
discarding the updated MFCC matrix for the neural network to make the keyword inference.

22. The non-transitory computer-readable medium of claim 18, wherein the subset of the MFCC_0 buffer includes a first 6 elements of the MFCC_0 buffer.

23. The non-transitory computer-readable medium of claim 17, wherein the audio signal is collected from only one microphone.

24. The non-transitory computer-readable medium of claim 17, wherein the MFCC matrix and the MFCC_0 buffer are updated every 32 ms.

* * * * *

UNITED STATES PATENT AND TRADEMARK OFFICE
CERTIFICATE OF CORRECTION

PATENT NO. : 11,335,332 B2
APPLICATION NO. : 16/708983
DATED : May 17, 2022
INVENTOR(S) : Nunziata Ivana Guarneri It is certified that error appears in the above-identified patent and that said Letters Patent is hereby corrected as shown below:

In the Claims

Claim 4, Column 14, Line 29, insert --the-- between "on" and "temporal".

Signed and Sealed this
Thirteenth Day of September, 2022

Katherine Kelly Vidal
*Director of the United States Patent and Trademark Office*